UNITED STATES PATENT OFFICE.

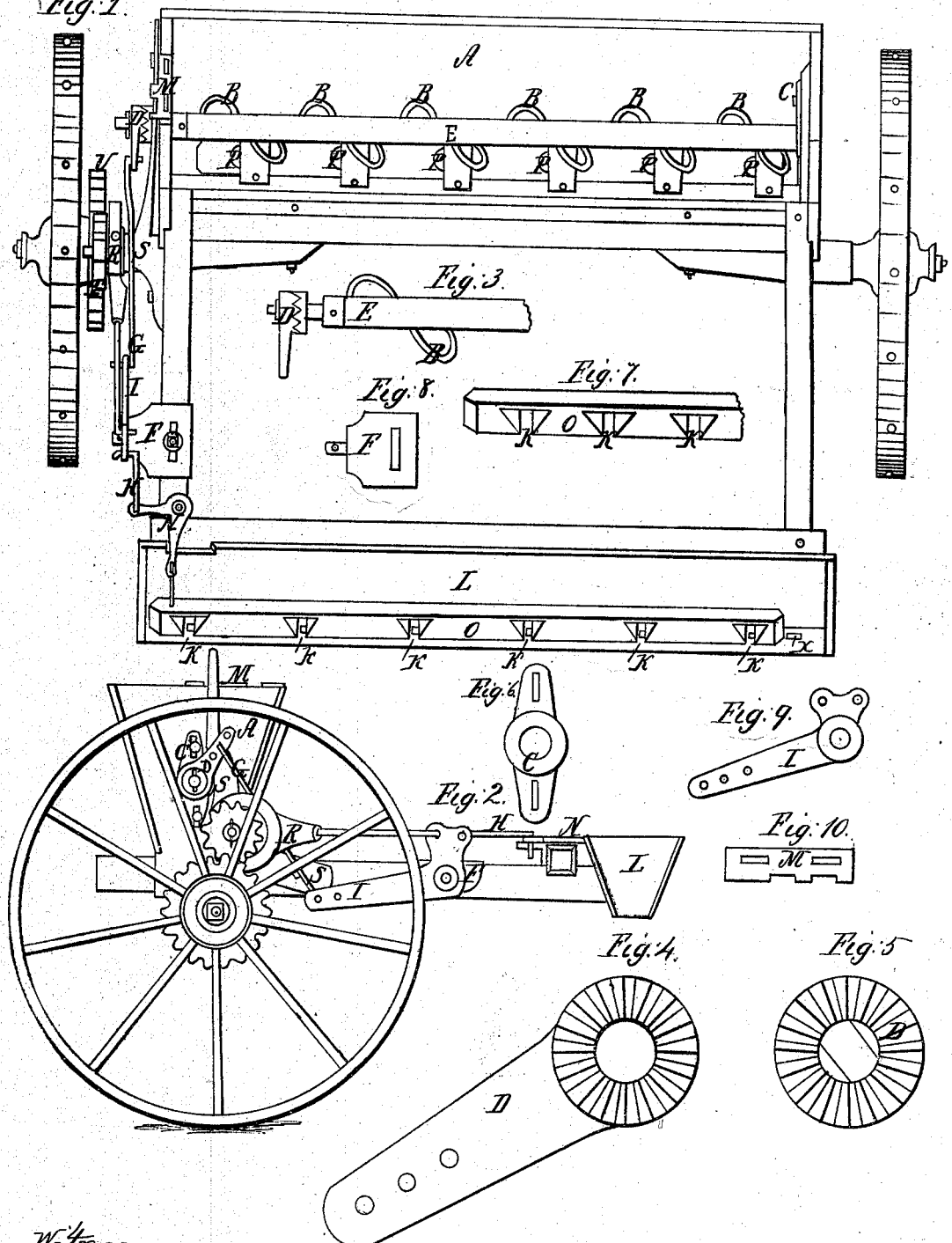

ARCHIBALD PUTNAM, OF OWEGO, NEW YORK, ASSIGNOR TO ELIZABETH PUTNAM, OF SAME PLACE.

IMPROVEMENT IN FERTILIZERS AND SEEDING-MACHINES.

Specification forming part of Letters Patent No. 112,490, dated March 7, 1871.

I, ARCHIBALD PUTNAM, of Owego, in the county of Tioga and State of New York, have invented certain Improvements in Fertilizing and Seeding Machines, of which the following is a specification:

My invention relates to certain improvements upon a fertilizing and seeding machine, so arranging and constructing it that it will sow alike all kinds of grain and pulverized fertilizers by the same operation, and also to the peculiar construction of the agitators, the object being to overcome the difficulty experienced in handling manures of different nature and condition—such as plaster, lime, guano, phosphates, &c.—and also to the peculiar construction of a number of pitmen and elbows in such a manner as to operate the grass-seeder separately or in connection with the fertilizing part of the machine, and likewise to the manner in which the grass-seed agitator is constructed.

Description of the Accompanying Drawing.

Figure 1 is a front elevation of a machine embodying my invention, with front sides of hoppers A and L detached, showing an interior view of the hoppers A and L. Fig. 2 is a side elevation of the same machine. Fig. 3 is a section of the shaft E, showing the agitator B and clutch D attached thereto. Fig. 4 is the outer section of the clutch D. Fig. 5 is the inner section of the clutch D. Fig. 6 is the adjustable plate C, in which the shaft E is hung. Fig. 7 is a section of the grass-seed-agitating bar O, showing the manner in which the dovetailed gain is formed. Fig. 8 is the elbow-holder F, showing the slot by which it is adjusted. Fig. 9 is the elbow I. Fig. 10 is the eccentric lever-catch M.

General Description.

First. A is the fertilizer and grain hopper, as shown at Fig. 1, placed upon a substantial frame mounted upon wheels similar to other like machines, placing the shaft E in the lower part of the hopper A, and attaching thereto the agitator B, running diagonally a part of the way around the shaft E, giving it a vibrating motion, which will cause the agitator B to swing or pass back and forth diagonally over the opening P.

Second. I so construct, arrange, and attach the agitator B, or its equivalent, to the shaft E, as shown at Fig. 3, as to form an open space between the lower edge of the agitator B and shaft E, for the purpose of allowing the substance used to pass freely through between the shaft E and the lower edge of the agitator B. Why I use this device is for the purpose of effectually preventing the grain or fertilizers from banking or clogging, which enables the operator to handle alike all kinds of grain or fertilizers, damp as well as dry. This part of my invention I apply to the forcing of the substance used through the openings P.

Third. I also hang the shaft E at each end in the adjustable sliding plate C, which admits of the shaft E being raised or lowered for the purpose of accommodating its working to coarse as well as fine fertilizers and grain.

Fourth. The adjustable elbow-holder F, as shown at Fig. 8, is formed with a slot in it, which admits of its being moved upon its bearing for the purpose of regulating the elbow I to an even stroke.

Fifth. I form the sliding plate C with a slot in one or both ends, and attach one at each end of the hopper A, making of them bearings for the vibrating shaft E to run in, the object being to raise or lower the shaft E.

Sixth. The eccentric lever-catch M, as shown at Fig. 10, is attached to the end of the hopper A, and is so formed as to admit of its being moved back and forth, for the purpose of adjusting the eccentric gear-wheel T to the driving gear-wheel U, which gives the operator perfect control over the mesh of the gear-wheels T and U.

Seventh. I connect the eccentric R with the main elbow I, which gives it a vibrating motion. I also connect the elbow I with the clutch D by the pitman G, which also communicates a vibrating motion to the shaft E. The elbows I and N, I connect by the pitman H. The elbow N is attached to the grass-seed agitator or bar O, which receives its vibrating motion through the pitman H and elbow N. The above combination is so arranged that by detaching the pitman H the fertilizing part of the machine can be run separately, or by attaching the pitman H and detaching the pitman G the grass-seeder can be run separately, or both can be run at the same time by attaching the pitmen G and H.

Eighth. I construct the grass-seed-agitating bar O with dovetailed gains or openings K K K, as at Fig. 7, made in the bottom of the bar O. Why I use this particular form is for the purpose of allowing the seed to easily flow in at the sides of the bar O, thus always supplying the openings X with plenty of seed.

Claims.

I claim as my invention—

1. The combination of the bent rods B B, as shown and described, with the rock-shaft E, all as set forth.

2. The arrangement of the slotted elbow-holder F, elbow I, eccentric R, and pitman G, all as and for the purposes set forth.

3. The arrangement of the cog-wheel T, eccentric R, lever S, and lever-catch M, all substantially as set forth.

4. In combination with the hopper A, with its openings P, the agitator-rods B, rock-shaft E, and slotted plates C C, all constructed and operated substantially as set forth.

5. The combination of the eccentric R, elbow I, shaft E, pitmen G and H, clutch D, elbow N, and seed-bar O, all arranged and operating substantially in the manner and for the purposes hereinbefore set forth.

ARCHIBALD PUTNAM.

Witnesses:
 C. G. SMITH,
 CHAS. KUNOLT.